Dec. 28, 1948.  H. GRIEBAT  2,457,365
VEHICLE WHEEL
Filed July 5, 1945  2 Sheets-Sheet 1
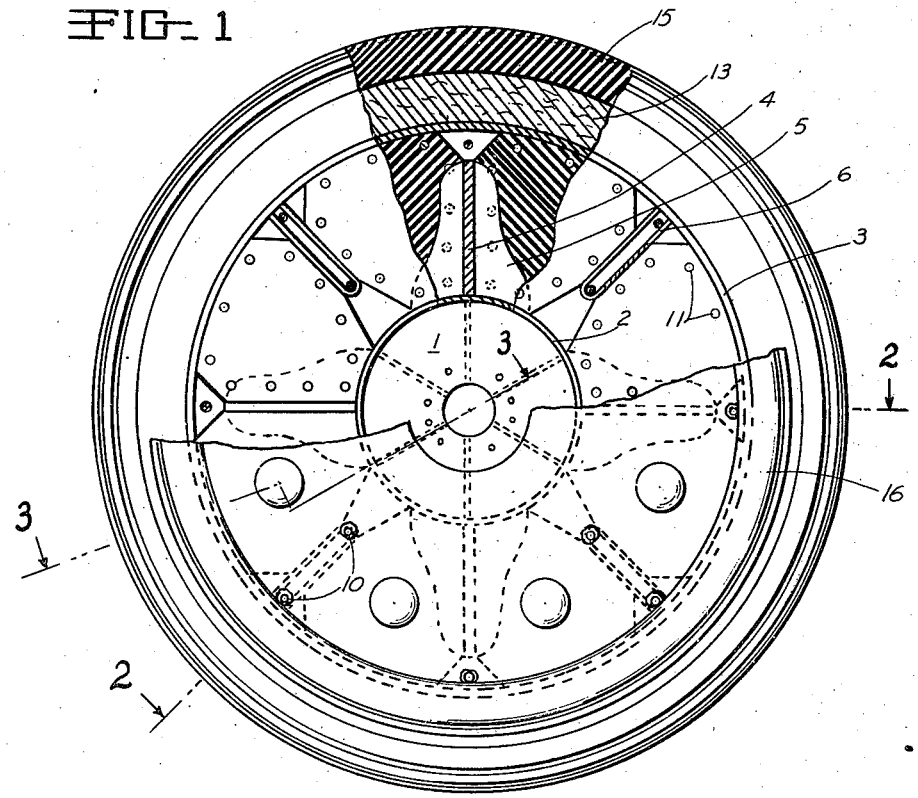
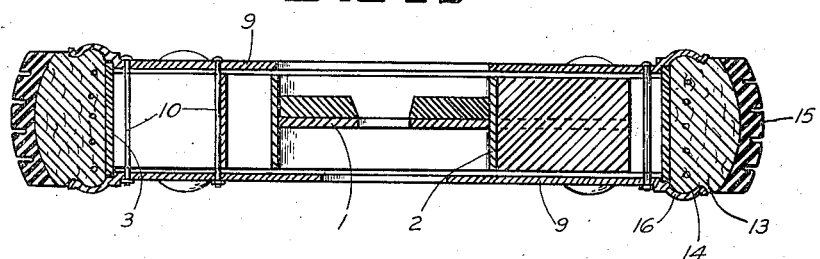
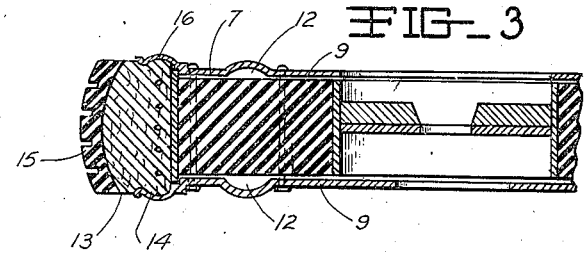
INVENTOR
Herman Griebat
BY
Harry C. Schroeder
HIS ATTORNEY Dec. 28, 1948.  H. GRIEBAT  2,457,365
VEHICLE WHEEL
Filed July 5, 1945  2 Sheets-Sheet 2
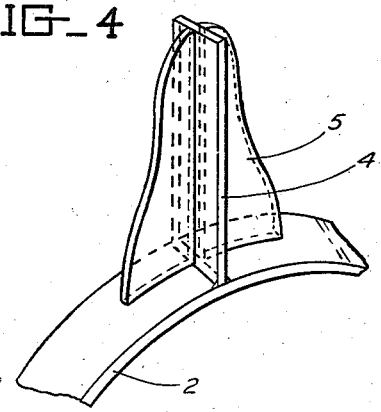
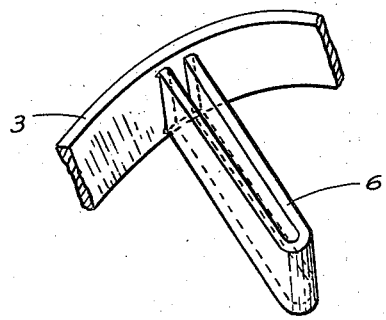
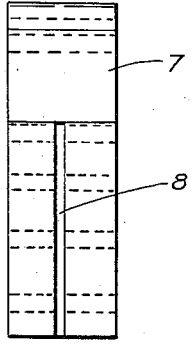
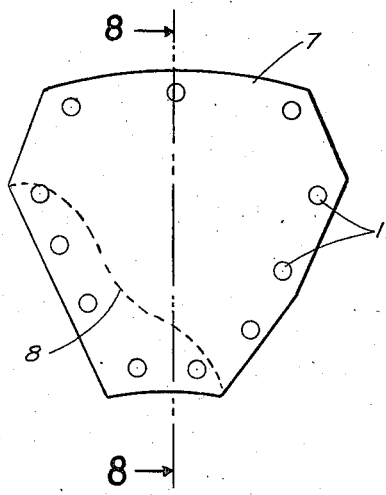
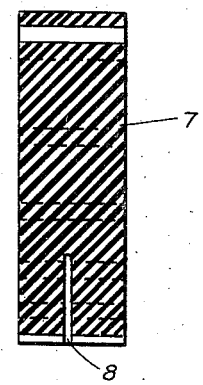
INVENTOR
Herman Griebat
BY
Harry C. Schroeder
HIS ATTORNEY Patented Dec. 28, 1948

2,457,365

UNITED STATES PATENT OFFICE 2,457,365

VEHICLE WHEEL

Herman Griebat, Lodi, Calif.

Application July 5, 1945, Serial No. 603,313

3 Claims. (Cl. 152—40)

This invention relates to a motor vehicle wheel; a major object being to provide a wheel particularly adapted for hard heavy duty service and which, while having a puncture-proof and relatively solid tire, has a certain amount of resiliency or cushioning action.

The wheel, while particularly designed for truck service, may also be used as a spare or emergency wheel for light autos or passenger cars.

Fig. 1 is a side elevation of the wheel, partly in section.

Fig. 2 is a transverse section on line 2—2 of Fig. 1.

Fig. 3 is a partial transverse section on line 3—3 of Fig. 1.

Fig. 4 is a fragmentary perspective view of one of the brace and rubber locating or drive members.

Fig. 5 is a similar view of one of the intermediate rubber separating or brace members.

Fig. 6 is an edge view of one of the rubber panels, detached.

Fig. 7 is a side elevation of a panel.

Fig. 8 is a transverse section on line 8—8 of Fig. 7.

Referring to the numerals of reference on the drawings, the wheel comprises a conventional hub disc 1 having an annular band 2 about its periphery and a tire supporting rim 3 separate from and concentric with band 2. Secured on and projecting radially out from band 2 and terminating short of band 3 are transverse plates or spacers 4 reinforced by integral ribs 5 centrally disposed and extending circumferentially of the wheel.

These spacers, which are also drive members, are disposed evenly about the wheel, and centrally between said spacers, slotted driven members 6 project radially inward from rim 3 toward hub terminating short of hub band 2.

Solid resilient rubber panels 7 are disposed closely between adjacent drive and driven members 4 and 6, and extend for the full radial distance between the rim and hub band, as well as for the full width thereof.

Lateral movement of the panel is prevented by the ribs 5, which seat in slots 8 formed in the panels.

The panels are enclosed between cover discs 9 which seat and move with rim 3 and which are secured as a unit by cross bolts 10 which extend through the slots in members 6 as shown. The discs clear the hub, however, so that there will be no rubbing therebetween with relative radial movement. Since, however, there is apt to be friction between the discs and rubber panels upon relative radial movement of the wheel parts and compression, accompanied by lateral spreading of the rubber panels, said panels, therefore, are formed about their periphery with transverse holes 11, which may be filled with graphite or the like.

In order to relieve the cover discs and their mounting bolts of undue strain, they are formed with internal recesses 12 into which the rubber of the panels may expand.

The tire preferably used on the wheel comprises a body 13 of fabric or the like, reinforced by circumferential wires 14 and provided with a tread portion 15 of rubber. The tire body is held in place by gripping flanges 16 formed with discs 9 radially out from rim 3.

While the tire preferably used on this wheel, known as a cushion tire, is preferred, it is evident that a pneumatic tire can also be substituted.

I claim:

1. A wheel comprising a hub, a tire supporting rim separate therefrom, resilient compressible panels between said rim and hub, said panels having their corners cut away to form an outer row of void spaces bounded externally by said tire supporting rim, and an inner row of void spaces bounded internally by said hub, transverse driving plates rigid with and projecting radially outward from said hub between and in contact with adjacent pairs of said panels, and transverse driving plates rigid with and projecting radially inward from said rim between and in contact with the individual panels of each of said pairs.

2. A wheel as in claim 1, with one set of means provided with the plates to retain the panels against lateral displacement.

3. A wheel as in claim 1, with brace ribs on one set of the plates intermediate their side edges, and extending circumferentially of the wheel; the panels having slots into which the ribs project.

HERMAN GRIEBAT.

REFERENCES CITED

The following references are of record in the file of this patent:

UNITED STATES PATENTS

| Number | Name | Date |
|---|---|---|
| 1,166,155 | Seidel | Dec. 28, 1915 |
| 1,328,779 | Barker | Jan. 20, 1920 |
| 1,381,996 | Jackson | June 21, 1921 |
| 1,434,497 | McRoberts | Nov. 7, 1922 |
| 1,442,047 | Chamberlain | Jan. 16, 1923 |